US006423782B1

(12) United States Patent
Yukimasa et al.

(10) Patent No.: US 6,423,782 B1
(45) Date of Patent: Jul. 23, 2002

(54) PROPYLENE COPOLYMER AND MOLDED OBJECT OBTAINED BY MOLDING THE COPOLYMER

(75) Inventors: Shinichi Yukimasa; Masahiko Endo; Masato Kijima; Takayuki Nakagawa, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/719,561

(22) PCT Filed: Apr. 26, 2000

(86) PCT No.: PCT/JP00/02738

§ 371 (c)(1),
(2), (4) Date: Dec. 28, 2000

(87) PCT Pub. No.: WO00/66639

PCT Pub. Date: Nov. 9, 2000

(30) Foreign Application Priority Data

Apr. 28, 1999 (JP) ............................................. 11-121396

(51) Int. Cl.⁷ ............................................. C08L 23/00
(52) U.S. Cl. ..................................................... 525/240
(58) Field of Search ................................. 525/191, 210, 525/232, 240

(56) References Cited

U.S. PATENT DOCUMENTS 5,656,696 A * 8/1997 Yamamoto et al. ......... 525/240

FOREIGN PATENT DOCUMENTS

| JP | 8-59766 A | * | 3/1996 |
| JP | 8-169924 A | * | 7/1996 |
| JP | 8-231662 A | * | 9/1996 |
| JP | 8-259647 A | * | 10/1996 |
| JP | 9-176227 A | * | 7/1997 |
| JP | 10-176022 A | * | 6/1998 |

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

The invention relates to a propylene-based copolymer and its moldings which are transparent and have good ordinary impact resistance, good cold impact resistance, and well-balanced flexibility and blocking resistance. The propylene-based copolymer comprises from 50 to 90% by weight of a propylene-ethylene copolymer [A] of such that (1) its ethylene content ($\alpha$) falls between 0.2 and 10% by weight, (2) the amount of its fraction (Wp) eluted within the temperature range between $(Tp-5)°C$. and $(Tp+5)°$ C. is at least 20% by weight, with Tp (°C.) being the peak temperature for essential elution in temperature-programmed fractionation chromatography of the copolymer, and (3) the amount of its fraction (W0) eluted within the temperature range not higher than 0° C. in temperature-programmed fractionation chromatography of the copolymer, and $\alpha$ satisfy a relation of $W0 \leq (3+2\alpha)/4$, and from 10 to 50% by weight of a propylene-ethylene copolymer [B] having an ethylene content of from 10 to 25% by weight.

7 Claims, No Drawings

PROPYLENE COPOLYMER AND MOLDED OBJECT OBTAINED BY MOLDING THE COPOLYMER

TECHNICAL FIELD

The present invention relato a propylene-based copolymer and to moldings formed by molding the copolymer. More precisely, the invention relates to a propylene-based copolymer and its moldings which are transparent and have good ordinary impact resistance, good cold impact resistance, and well-balanced flexibility and blocking resistance.

BACKGROUND ART

In the field of polypropylene resins, more rigid materials are much studied and developed, while, on the other hand, softer materials are being specifically noted. In this field, desired are soft materials that are more flexible and more transparent and have better impact resistance.

To meet the requirement, propylene homopolymers, propylene-ethylene random copolymers, and propylene block copolymers produced by first preparing a propylene homopolymer or copolymer in the first stage followed by randomly copolymerizing propylene with any other α-olefins in the second stage have been proposed. However, propylene homopolymers are poorly flexible and poorly resistant to shock. Propylene-ethylene random copolymers are also poorly flexible and poorly resistant to shock, though they are transparent. Conventional propylene block copolymers are resistant to shock as they have a sea-island structure composed of a crystalline phase and an amorphous phase, but the components constituting them have a different refractive index. Therefore, their drawbacks are that they are poorly transparent and poorly flexible. In the prior art at present, no one can obtain polypropylene-based polymers that are transparent and have good ordinary impact resistance, good cold impact resistance, and well-balanced flexibility and blocking resistance.

The present invention is to provide a propylene-based copolymer and its moldings which are transparent and have good ordinary impact resistance, good cold impact resistance, and well-balanced flexibility and blocking resistance.

DISCLOSURE OF THE INVENTION

We, the present inventors have assiduously studied so as to solve the problems noted above, and, as a result, have found that a propylene-based copolymer obtained in high-temperature multi-stage vapor-phase polymerization of propylene and comonomer in the presence of a catalyst that comprises a solid catalyst component comprising magnesium, titanium, halogen atom and a specific electron donor compound, along with an organoaluminium compound and a specific organosilicon compound, with varying the comonomer content of the copolymer, is transparent and has good ordinary impact resistance, good cold impact resistance and well-balanced flexibility and blocking resistance. On the basis of this finding, we have completed the present invention. Specifically, the invention provides a propylene-based copolymer and its moldings mentioned below.

1. A propylene-based copolymer comprising from 50 to 90% by weight of a propylene-ethylene copolymer [A] that satisfies the following (1) to (3), and from 10 to 50% by weight of a propylene-ethylene copolymer [B] having an ethylene content of from 10 to 25% by weight:

(1) Its ethylene content (α) measured in $^{13}$C-NMR falls between 0.2 and 10% by weight;
(2) The amount of its fraction (Wp) eluted within the temperature range between (Tp−5)° C. and (Tp+5)° C. is at least 20% by weight, with Tp (°C.) being the peak temperature for essential elution in temperature-programmed fractionation chromatography of the copolymer; and
(3) The amount of its fraction (W0) eluted within the temperature range not higher than 0° C. in temperature-programmed fractionation chromatography of the copolymer, and α satisfy a relation of W0≦(3+2α)/4.

2. The propylene-based copolymer of above 1, which is obtained in propylene block copolymerization for copolymerizing propylene and ethylene in multiple stages.

3. The propylene-based copolymer of above 1 or 2, which comprises from 50 to 85% by weight of a propylene-ethylene copolymer [A] that satisfies the following (1) to (3), and from 15 to 50% by weight of a propylene-ethylene copolymer [B] having an ethylene content of from 10 to 25% by weight:

(1) Its ethylene content (α) measured in $^{13}$C-NMR falls between 0.5 and 9% by weight;
(2) The amount of its fraction (Wp) eluted within the temperature range between (Tp−5)° C. and (Tp+5)° C. is at least 20% by weight, with Tp (°C.) being the peak temperature for essential elution in temperature-programmed fractionation chromatography of the copolymer; and
(3) The amount of its fraction (W0) eluted within the temperature range not higher than 0° C. in temperature-programmed fractionation chromatography of the copolymer, and α satisfy a relation of W0<(3+2α)/4.

4. The propylene-based copolymer of any of above 1 to 3, which satisfies the following requirement:

$$TM > 2 \times 10^5 \times (\beta)^{-1.7}$$

wherein β indicates the amount of the component [B] (% by weight) in the copolymer, and TM indicates the tensile modulus (MPa) of the copolymer.

5. The propylene-based copolymer of any of above 2 to 4, for which the propylene block copolymerization in above 2 is for multi-stage polymerization of propylene and ethylene in the presence of a catalyst that comprises (A) a solid catalyst component obtained by reacting a magnesium compound, a titanium compound and an electron donor compound through their contact with each other, (B) an organoaluminium compound, and (C) an organosilicon compound of the following general formula (I):

$$SiR^1{}_2(OR^2)_2 \qquad (I)$$

wherein $R^1$ represents a branched chain hydrocarbon group having from 1 to 20 carbon atoms, or a saturated cyclic hydrocarbon group; $R^2$ represents a linear or branched chain hydrocarbon group having from 1 to 4 carbon atoms; and these may be the same or different.

6. The propylene-based copolymer of any of above 2 to 4, for which the propylene block copolymerization in above 2 is for multi-stage polymerization of propylene and ethylene in the presence of a catalyst that comprises (A) a solid catalyst component obtained by contacting a magnesium compound, a titanium compound, an electron donor compound and optionally a silicon compound with each other at a temperature falling between 120° C. and 150° C., followed by washing the resulting product in an inert solvent at a temperature falling between 100° C. and 150° C., (B) an organoaluminium compound, and optionally (C) an electron donor compound serving as a third component.

7. A molding of the propylene-based copolymer of any of above 1 to 4.

BEST MODES OF CARRYING OUT THE INVENTION

The propylene-based copolymer [I] and the moldings [II] formed by molding the copolymer of the invention are described in detail hereinunder.

[I] Propylene-based Copolymer:

The propylene-based copolymer of the invention comprises from 50 to 90% by weight of a propylene-ethylene copolymer [A] that satisfies the following (1) to (3), and from 10 to 50% by weight of a propylene-ethylene copolymer [B] having an ethylene content of from 10 to 25% by weight:

(1) Its ethylene content ($\alpha$) measured in $^{13}$C-NMR falls between 0.2 and 10% by weight;

(2) The amount of its fraction (Wp) eluted within the temperature range between (Tp−5)° C. and (Tp+5)° C. is at least 20% by weight, with Tp (°C.) being the peak temperature for essential elution in temperature-programmed fractionation chromatography of the copolymer; and (3) The amount of its fraction (W0) eluted within the temperature range not higher than 0° C. in temperature-programmed fractionation chromatography of the copolymer, and $\alpha$ satisfy a relation of W0$\leq$(3+2$\alpha$)/4.

The propylene-based copolymer of the invention satisfies the requirements noted above, and its moldings are transparent and have good ordinary impact resistance, good cold impact resistance and well-balanced flexibility and blocking resistance. For example, films formed out of the copolymer have a tensile modulus of at most 1000 MPa and a haze of at most 15%, preferably a tensile modulus of from 100 MPa to 800 MPa and a haze of from 1% to 10%. Other advantages are that the moldings of the copolymer have good ordinary impact resistance, good cold impact resistance and good blocking resistance and are not sticky.

The propylene-based copolymer of the invention comprises from 50 to 90% by weight of the propylene-ethylene copolymer [A] and from 10 to 50% by weight of the propylene-ethylene copolymer [B], preferably from 50 to 85% by weight of [A] and from 15 to 50% by weight of [B]. If the amount of [B] therein is smaller than 10% by weight, the copolymer is not flexible and is not resistant to shock. However, if the amount of [B] therein is larger than 50% by weight, the blocking resistance of the copolymer films is poor and the fluidity of the copolymer powder is poor.

Preferably, the propylene-based copolymer of the invention comprises from 50 to 85% by weight of a propylene-ethylene copolymer [A] that satisfies the following (1) to (3), and from 15 to 50% by weight of a propylene-ethylene copolymer [B] having an ethylene content of from 10 to 25% by weight:

(1) Its ethylene content ($\alpha$) measured in $^{13}$C-NMR falls between 0.5 and 9% by weight;

(2) The amount of its fraction (Wp) eluted within the temperature range between (Tp−5)° C. and (Tp+5)° C. is at least 20% by weight, with Tp (°C.) being the peak temperature for essential elution in temperature-programmed fractionation chromatography of the copolymer; and (3) The amount of its fraction (W0) eluted within the temperature range not higher than 0° C. in temperature-programmed fractionation chromatography of the copolymer, and $\alpha$ satisfy a relation of W0$\leq$(3+2$\alpha$)/4.

The ethylene content of the propylene-ethylene copolymer [B] in the invention must fall between 10 and 25% by weight. Preferably, it falls between 15 and 25% by weight. If the ethylene content of [B] therein is smaller than 10% by weight, the copolymer is unfavorable as its impact resistance is poor. However, if the ethylene content of [B] therein is larger than 25% by weight, the copolymer is also unfavorable since its transparency is low.

The propylene-based copolymer of the invention may be a propylene block copolymer obtained in propylene block copolymerization for copolymerizing propylene and ethylene in multiple stages.

The constituent components are described below.

[1] Propylene-ethylene Copolymer [A]:

The propylene-ethylene copolymer [A] in the invention satisfies the above-mentioned (1) to (3).

Specifically;

(1) The ethylene content ($\alpha$) of the copolymer [A] measured in $^{13}$C-NMR falls between 0.2 and 10% by weight, preferably between 0.5 and 9% by weight, more preferably between 1 and 5% by weight. If its ethylene content ($\alpha$) is smaller than 0.2% by weight, the component [A] could not improve the heat sealability of the copolymer containing it. If, however, the ethylene content of [A] is larger than 10% by weight, films of the copolymer are not tough. The ethylene content ($\alpha$) of [A] is measured in $^{13}$C-NMR according to the "resin evaluation method" described in the section of Examples.

(2) The amount of the fraction (Wp) of [A] eluted within the temperature range between (Tp−5)° C. and (Tp+5)° C. is at least 20% by weight, with Tp (°C.) being the peak temperature for essential elution in temperature-programmed fractionation chromatography of [A]; preferably, $$20 \leq Wp, \text{ and } (80-15\alpha) \leq Wp;$$

more preferably, $$30 \leq Wp, \text{ and } (90-12\alpha) \leq Wp.$$

Wp smaller than 20% by weight means that the essential elution peak trails long to the high-temperature side and/or the low-temperature side. This is unfavorable, since the low-temperature fractions make the copolymer films sticky, and since the high-temperature fractions detract from the heat sealability of the copolymer, and augment the molding condition dependency for the transparency of the copolymer moldings. Tp (°C.) is the peak temperature for essential elution that appears in the elution curve of temperature-programmed fractionation chromatography to be effected according to the "resin evaluation method" described in the section of Examples. Wp is read on the elution curve.

(3) The amount of the fraction (W0) of [A] eluted within the temperature range not higher than 0° C. in temperature-programmed fractionation chromatography, and $\alpha$ satisfy a relation of W0$\leq$(3+2$\alpha$)/4, preferably W0$\leq$(2+2$\alpha$)/4.

If the parameters do not satisfy W0$\leq$(3+2$\alpha$)/4, it is unfavorable since the copolymer films are sticky and are often troubled by additives and low-molecular-weight components bleeding out on them. W0 is read on the elution curve of temperature-programmed fractionation chromatography to be effected according to the "resin evaluation method" described in the section of Examples.

Preferably, the propylene-ethylene copolymer [A] for use in the invention satisfies, in addition to the requirements mentioned above, an additional requirement of the following formula (1) that indicates the relation between its melting point (Tm (°C.)) measured in differential scanning calorimetry (DSC), and α:

$$Tm \leq 160 - 5\alpha \quad (1),$$

more preferably, $$Tm \leq 160 - 6\alpha \quad (2).$$

If the copolymer [A] does not satisfy this requirement, its heat sealability will be unsatisfactory, and, in addition, its blocking resistance will be poor. To measure the melting point (Tm (°C.)) of the copolymer in differential scanning calorimetry (DSC), for example, employed is a Perkin-Elmer's differential scanning calorimeter, DSC7 Model. Briefly, 10 mg of a sample to be measured is first melted in a nitrogen atmosphere at 230° C. for 3 minutes, then cooled to 20° C. at a cooling rate of 10° C./min, kept at 20° C. for 3 minutes, and thereafter again heated at a heating rate of 10° C./min. In the endothermic curve indicating the melting profile of the sample, thus obtained, the temperature for the peak top of the highest peak is read. This is the melting point of the sample.

It is desirable that the propylene-ethylene copolymer [A] for use in the invention contains some high-temperature fractions that are eluted at higher temperatures than the essential elution in temperature-programmed fractionation chromatography, in some degree rather than nothing, since the high-temperature fractions may improve the moldability of the propylene-based copolymer of the invention (including the releasability of the copolymer moldings from chill rolls, etc.), and may improve the toughness of the copolymer moldings. To that effect, it is more desirable that the fraction of [A] (WH % by weight) to be eluted within the temperature range not lower than (Tp+5)° C., and α satisfy the following relation:

$$0.1 \leq WH \leq 3\alpha,$$

even more preferably, $$WH \leq (3\alpha - 3), \text{ and } (3\alpha - 15) \leq WH.$$

Like W0, WH is read on the elution curve of temperature-programmed fractionation chromatography to be effected according to the "resin evaluation method" described in the section of Examples.

Also preferably, the boiling diethyl ether-extracted fraction (E % by weight) of the propylene-ethylene copolymer [A] is at most 2.5% by weight, and E and α of [A] satisfy the following relation:

$$E \leq (2\alpha + 15)/10,$$

more preferably, $$E \leq (\alpha + 5)/5.$$

Satisfying this requirement, the copolymer films are not sticky and are favorable. E may be obtained as follows: 3 g of pellets of a sample to be measured (the pellets are ground into grains capable of passing through a 1 mmφ mesh) are put into a cylindrical paper filter. 160 ml of an extraction solvent, diethyl ether is put into a flat bottom flask. These are set in a Soxhlet extractor, and the sample is extracted for 10 hours at a frequency of refluxing of once/5 minutes or so. The resulting diethyl ether extract is recovered by the use of a rotary evaporator, and then dried in a vacuum drier until it comes to have a constant weight. From the weight of the thus-dried extract, the boiling diethyl ether-extracted fraction of the sample is obtained.

Also preferably, the propylene-ethylene copolymer [A] for use in the invention has a melt index (MI, g/10 min) falling between 0.1 and 200 g/10 min, more preferably between 1 and 40 g/10 min, even more preferably between 2 and 20 g/10 min. If its melt index oversteps the defined range, the moldability of the copolymer will be poor. MI (g/10 min) of the copolymer is measured at 230° C. and under load of 2160 g, according to JIS K7210.

Also preferably, the propylene-ethylene copolymer [A] has a stereospecificity index (P mol %) of at least 98 mol %, more preferably at least 98.5 mol %, measured in $^{13}$C-NMR according to the "resin evaluation method" described in the section of Examples. If the stereospecificity index of the copolymer [A] is smaller than 98 mol %, the copolymer films will be poorly tough and their blocking resistance will be poor.

The propylene-ethylene copolymer [A] for use in the invention is not specifically defined, and may be any and every one prepared through copolymerization of propylene and ethylene. For this, however, preferred is a propylene-ethylene random copolymer.

[2] Propylene-ethylene copolymer [B]:

The ethylene content of the propylene-ethylene copolymer [B] for use in the invention must fall between 10 and 25% by weight. Preferably, it falls between 15 and 25% by weight. If the ethylene content of [B] therein is smaller than 10% by weight, the copolymer is unfavorable as its impact resistance is poor. However, if the ethylene content of [B] therein is larger than 25% by weight, the copolymer is also unfavorable since its transparency is low. In addition to the above-mentioned requirement for it, the copolymer [B] preferably has a limiting viscosity [η] of from 0.1 to 5 dl/g, measured in a solvent of tetralin at 135° C.

Also preferably, the propylene-based copolymer of the invention satisfies the following requirement:

$$TM < 2 \times 10^5 \times (\beta)^{-1.7}$$

wherein β indicates the amount of the component [B] (% by weight) in the copolymer, and TM indicates the tensile modulus (MPa) of the copolymer.

Satisfying the requirement, the copolymer films have well-balanced flexibility and transparency. For example, the copolymer films have a tensile modulus of at most 1000 MPa and a haze of at most 15%.

More preferably, the copolymer satisfies the following relation:

$$TM < 10^5 \times (\beta)^{-1.6}.$$

Satisfying the relation, for example, the copolymer films have a tensile modulus of at most 1000 MPa and a haze of at most 10%.

The propylene-ethylene copolymer [B] for use in the invention is not specifically defined, and may be any and every one prepared through copolymerization of propylene and ethylene. For this, however, preferred is a propylene-ethylene random copolymer.

[3] Method for Producing Propylene-ethylene Copolymers [A], [B]:

For producing the propylene-ethylene copolymers [A] and [B], for example, employable is a method of copolymerizing ethylene and propylene in the presence of a catalyst that comprises (A) a solid catalyst component to be prepared by contacting a magnesium compound, a titanium compound, an electron donor compound and optionally a silicon compound with each other, (B) an organoaluminium compound, and optionally (C) an electron donor compound serving as a third component.

Preferably, ethylene and propylene are copolymerized in the presence of a catalyst that comprises (A) a solid catalyst component obtained by reacting a magnesium compound, a titanium compound and an electron donor compound through their contact with each other, (B) an organoaluminium compound, and (C) an organosilicon compound of the following general formula (I):

$$SiR^1{}_2(OR^2)_2 \qquad (I)$$

wherein $R^1$ represents a branched chain hydrocarbon group having from 1 to 20 carbon atoms, or a saturated cyclic hydrocarbon group; $R^2$ represents a linear or branched chain hydrocarbon group having from 1 to 4 carbon atoms; and these may be the same or different.

More preferably, ethylene and propylene are copolymerized in the presence of a catalyst that comprises (A) a solid catalyst component obtained by contacting a magnesium compound, a titanium compound, an electron donor compound and optionally a silicon compound with each other at a temperature falling between 120° C. and 150° C., followed by washing the resulting product in an inert solvent at a temperature falling between 100° C. and 150° C., (B) an organoaluminium compound, and optionally (C) an electron donor compound serving as a third component.

Even more preferably, ethylene and propylene are copolymerized in the presence of a catalyst that comprises (A) a solid catalyst component obtained by reacting a reaction product having been prepared through reaction of a magnesium dialkoxide, an ester compound, and a silicon compound of the following general formula (II):

$$Si(OR^3)_m X^1{}_{4-m} \qquad (II)$$

wherein $R^3$ represents an alkyl group, a cycloalkyl group, or an aryl group; $X^1$ represents a halogen atom such as a chlorine or bromine atom; and m indicates a real number falling between 0 and 3.0,
with a titanium tetrahalide at a temperature falling between 120° C. and 150° C., followed by washing the resulting product in a hydrocarbon solvent at a temperature falling between 80° C. and 150° C., (B) an organoaluminium compound, and the organosilicon compound of formula (I).

The catalyst components and their preparation, and the methods of ethylene-propylene copolymerization are described below.

Catalyst Components (A) Solid Catalyst Component:

The solid catalyst component comprises magnesium, titanium and an electron donor, and is formed from (a) a magnesium compound, (b) a titanium compound, (c) an electron donor compound, and optionally (d) a silicon compound, which are mentioned below.

(a) Magnesium Compound:

The magnesium compound is not specifically defined, for which, however, preferred are those of the following general formula (III):

$$MgR^4R^5 \qquad (III).$$

In formula (III), $R^4$ and $R^5$ each represent a hydrocarbon group, $OR^6$ (where $R^6$ indicates a hydrocarbon group), or a halogen atom. The hydrocarbon group for $R^4$ and $R^5$ includes an alkyl group having from 1 to 12 carbon atoms, a cycloalkyl group, an aryl group, an aralkyl group, etc.; $R^6$ in $OR^6$ includes an alkyl group having from 1 to 12 carbon atoms, a cycloalkyl group, an aryl group, an aralkyl group, etc. The halogen atom includes chlorine, bromine, iodine and fluorine atoms. $R^4$ and $R^5$ may be the same or different.

Specific examples of the magnesium compounds of formula (III) include alkylmagnesiums and arylmagnesiums such as dimethylmagnesium, diethylmagnesium, diisopropylmagnesium, dibutylmagnesium, dihexylmagnesium, dioctylmagnesium, butylethylmagnesium, diphenylmagnesium, dicyclohexylmagnesium, etc.; alkoxymagnesiums and aryloxymagnesiums such as dimethoxymagnesium, diethoxymagnesium, dipropoxymagnesium, dibutoxymagnesium, dihexoxymagnesium, dioctoxymagnesium, diphenoxymagnesium, dicyclohexoxymagnesium, etc.; alkylmagnesium halides and arylmagnesium halides such as ethylmagnesium chloride, butylmagnesium chloride, hexylmagnesium chloride, isopropylmagnesium chloride, isobutylmagnesium chloride, t-butylmagnesium chloride, phenylmagnesium bromide, benzylmagnesium chloride, ethylmagnesium bromide, butylmagnesium bromide, phenylmagnesium chloride, butylmagnesium iodide, etc.; alkoxymagnesium halides and aryloxymagnesium halides such as butoxymagnesium chloride, cyclohexyloxymagnesium chloride, phenoxymagnesium chloride, ethoxymagnesium bromide, butoxymagnesium bromide, ethoxymagnesium iodide, etc.; magnesium halides such as magnesium chloride, magnesium bromide, magnesium iodide, etc.

Of those magnesium compounds, preferred are magnesium halides, alkoxymagnesiums, alkylmagnesiums, and alkylmagnesium halides, in view of the polymerization activity and the stereospecificity of the catalyst.

The magnesium compounds may be prepared from metal magnesium or from other magnesium-containing compounds.

One example of preparing the magnesium compounds comprises contacting metal magnesium with a halogen and an alcohol.

The halogen includes iodine, chlorine, bromine and fluorine; and iodine is preferred. The alcohol includes methanol, ethanol, propanol, butanol, cyclohexanone, octanol, etc.

Another example comprises contacting a magnesium dialkoxide of $Mg(OR^7)_2$ where $R^7$ indicates a hydrocarbon group having from 1 to 20 carbon atoms, with a halide. As the case may be, the magnesium dialkoxide may be previously contacted with a halide. The halide includes silicon tetrachloride, silicon tetrabromide, tin tetrachloride, tin tetrabromide, hydrogen chloride, etc. Of these, preferred is silicon tetrachloride in view of the polymerization activity and the stereospecificity of the catalyst. $R^7$ includes an alkyl group such as a methyl group, an ethyl group, a propyl group, an isopropyl group, a butyl group, an isobutyl group, a hexyl group, an octyl group, etc.; a cyclohexyl group; an alkenyl group such as an allyl group, a propenyl group, a butenyl group, etc.; an aryl group such as a phenyl group, a tolyl group, a xylyl group, etc.; an aralkyl group such as a phenethyl group, a 3-phenylpropyl group, etc. Of these, especially preferred is an alkyl group having from 1 to 10 carbon atoms.

The magnesium compound may be held on a support such as silica, alumina, polystyrene, etc. One or more of the above-mentioned magnesium compounds may be used herein either singly or as combined. If desired, the magnesium compound may contain a halogen such as iodine, etc., any other element such as silicon, aluminium, etc. Also if desired, it may contain an electron donor of, for example, alcohols, ethers, esters, etc.

(b) Titanium Compound:

The titanium compound is not specifically defined, but p referred are compounds of a general formula (IV):

$$TiX^1_p(OR^8)_{4-p} \tag{IV}$$

In formula (IV), $X^1$ represents a halogen atom, and is preferably a chlorine or bromine atom. More preferred is a chlorine atom. $R^8$ represents a hydrocarbon group, which may be saturated or unsaturated, and may be linear, branched or cyclic. It may contain hetero atoms of sulfur, nitrogen, oxygen, silicon, phosphorus, etc. Preferably, $R^8$ is a hydrocarbon group having from 1 to 10 carbon atoms, concretely including an alkyl group, an alkenyl group, a cycloalkenyl group, an aryl group and an aralkyl group. Especially preferred is a linear or branched alkyl group. Plural —$OR^8$'s, if any, may be the same or different. Specific examples of $R^8$ include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group, etc. p is an integer of from 0 to 4.

Specific examples of the titanium compounds of formula (IV) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium trihalides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, diisopropoxytitanium dichloride, di-n-propoxytitanium dichloride, diethoxytitanium dibromide, etc.; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds, in view of the polymerization activity of the catalyst. More preferred is titanium tetrachloride. One or more of these titanium compounds may be used herein either singly or as combined.

(c) Electron Donor Compound:

The electron donor compound includes oxygen-containing electron donors such as alcohols, phenols, ketones, aldehydes, esters of organic acids or inorganic acids, and also ethers including monoethers, diethers, polyethers, etc.; and nitrogen-containing electron donors such as ammonia, amines, nitriles, isocyanates, etc. The organic acids include carboxylic acids such as malonic acid, etc.

Of those, preferred are polycarboxylates, and more preferred are aromatic polycarboxylates. In view of the polymerization activity of the catalyst, even more preferred are monoesters and/or diesters of aromatic dicarboxylic acids. In those esters, the organic group that forms the ester moiety is preferably a linear, branched or cyclic aliphatic hydrocarbon group.

Concretely mentioned for such polycarboxylates are dialkyl esters of phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid, indane-5,6-dicarboxylic acid, etc., in which the alkyl group may be any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethylbutyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-ethylpentyl, and 3-ethylpentyl groups, of these compounds, preferred are diphthalates, and more preferred are those in which the organic group to form the ester moiety is a linear or branched aliphatic hydrocarbon group having at least 4 carbon atoms.

Specific examples of the preferred compounds are di-n-butyl phthalate, diisobutyl phthalate, di-n-heptyl phthalate, diethyl phthalate, etc.

One or more of these compounds may be used herein either singly or as combined.

(d) Silicon Compound:

For forming the solid catalyst component, a silicon compound of the following formula (II) is optionally used for the component (d), in addition to the above-mentioned components (a), (b) and (c).

$$Si(OR^3)_m X^1_{4-m} \tag{II}$$

wherein $R^3$ represents an alkyl group, a cycloalkyl group, or an aryl group; $X^1$ represents a halogen atom such as a chlorine or bromine atom; and m indicates a real number falling between 0 and 3.0. The silicon compound improves the catalyst activity and the stereospecificity of the catalyst, and will reduce the fine powder content of the polymer produced in the presence of the catalyst.

In formula (II), $R^3$ represents an alkyl group, a cycloalkyl group, or an aryl group. The alkyl group preferably has from 1 to 10 carbon atoms. Concretely, it includes a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, etc. The cycloalkyl group includes a cyclopentyl group, a cyclohexyl group, a cyclohexenyl group, etc. The aryl group includes a phenyl group, a tolyl group, a benzyl group, a phenethyl group, etc. $X^1$ represents a halogen atom such as a chlorine or bromine atom. Preferably, it is a chlorine atom or a bromine atom, more preferably a chlorine atom. m indicates a real number falling between 0 and 3.0.

Specific examples of the silicon compounds of formula (II) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane, tripropoxychlorosilane, etc. Of those, especially preferred is silicon tetrachloride. One or more of these silicon compounds may be used herein either singly or as combined.

(B) Organoaluminium Compound:

The organoaluminium compound (B) to be used in producing the propylene-based copolymer of the invention is not specifically defined, but preferred are those containing an alkyl group, a halogen atom, a hydrogen atom and an alkoxy group, aluminoxanes and their mixtures. Concretely, it includes trialkylaluminiums such as trimethylaluminium, triethylaluminium, triisopropylaluminium, triisobutylaluminium, trioctylaluminium, etc.; dialkylaluminium monochlorides such as diethylaluminium monochloride, diisopropylaluminium monochloride, diisobutylaluminium monochloride, dioctylaluminium monochloride, etc.; alkylaluminium sesqui-halides such as ethylaluminium sesqui-chloride, etc.; linear aluminoxanes such as methylaluminoxane, etc. Of those organoaluminium compounds, preferred are trialkylaluminiums with lower alkyl groups each having from 1 to 5 carbon atoms; and especially preferred are trimethylaluminium, triethylaluminium, tripropylaluminium, and triisobutylaluminium. One or more of these organoaluminium compounds may be used herein either singly or as combined.

(C) Third Component (Electron Donor Compound):

In producing the propylene-based copolymer of the invention, used is an electron donor compound (C). The electron donor compound (C) includes Si—O—C bond-having organosilicon compounds, nitrogen-containing compounds, phosphorus-containing compounds, and oxygen-containing compounds. Of those, preferred are Si—O—C bond-having organosilicon compounds, ethers and esters, in view of the polymerization activity and the stereospecificity of the catalyst. More preferred are Si—O—C bond-containing organosilicon compounds.

Specific examples of the Si—O—C bond-having organosilicon compounds are tetramethoxysilane, tetraethoxysilane, tetrabutoxysilane, tetraisobutoxysilane, trimethylmethoxysilane, trimethylethoxysilane, triethylmethoxysilane, triethylethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl)dimethoxysilane, t-butylamyldimethoxysilane, t-butylhexyldimethoxysilane, t-butylheptyldimethoxysilane, t-butyloctyldimethoxysilane, t-butylnonyldimethoxysilane, t-butyldecyldimethoxysilane, t-butyl(3,3,3-trifluoromethylpropyl)dimethoxysilane, cyclohexylmethyldimethoxysilane, cyclohexylethyldimethoxysilane, cyclohexylpropyldimethoxysilane, cyclopentyl-t-butyldimethoxysilane, cyclohexyl-t-butyldimethoxysilane, dicyclopentyldimethoxysilane, dicyclohexyldimethoxysilane, bis(2-methylcyclopentyl)dimethoxysilane, bis(2,3-dimethylcyclopentyl)dimethoxysilane, diphenyldimethoxysilane, phenyltriethoxysilane, methyltrimethoxysilane, ethyltrimethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornyltrimethoxysilane, indenyltrimethoxysilane, 2-methylcyclopentyltrimethoxysilane, cyclopentyl(t-butoxy)dimethoxysilane, isopropyl(t-butoxy)dimethoxysilane, t-butyl(isobutoxy)dimethoxysilane, t-butyl(t-butoxy)dimethoxysilane, thexyltrimethoxysilane, thexylisopropoxydimethoxysilane, thexyl(t-butoxy)dimethoxysilane, thexylmethyldimethoxysilane, thexylethyldimethoxysilane, thexylisopropyldimethoxysilane, thexylcyclopentyldimethoxysilane, thexylmyristyldimethoxysilane, thexylcyclohexyldimethoxysilane, etc.

Organosilicon compounds of the following general formula (V) are also usable herein.

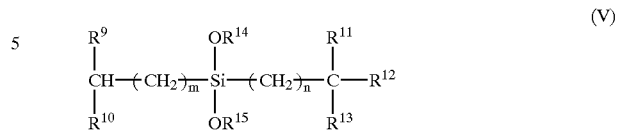

wherein $R^9$ to $R^{11}$ each represent a hydrogen atom or a hydrocarbon group, and they may be the same or different, and may form a ring along with the group adjacent thereto; $R^{12}$ and $R^{13}$ each represent a hydrocarbon group, and they may be the same or different, and may form a ring along with the group adjacent thereto; $R^{14}$ and $R^{15}$ each represent an alkyl group having from 1 to 20 carbon atoms, and they may be the same or different; m is an integer of at least 2; and n is an integer of at least 2.

Concretely, $R^9$ to $R^{11}$ include a hydrogen atom; a linear hydrocarbon group such as a methyl group, an ethyl group, an n-propyl group, etc.; a branched hydrocarbon group such as an isopropyl group, an isobutyl group, a t-butyl group, a thexyl group, etc.; a saturated cyclic hydrocarbon group such as a cyclobutyl group, a cyclopentyl group, a cyclohexyl group, etc.; an unsaturated cyclic hydrocarbon group such as a phenyl group, apentamethylphenyl group, etc. Of those, preferred are a hydrogen atom, and a linear hydrocarbon group having from 1 to 6 carbon atoms; and more preferred are a hydrogen atom, a methyl group and an ethyl group.

$R^{12}$ and $R^{13}$ include a linear hydrocarbon group such as a methyl group, an ethyl group, an n-propyl group, etc.; a branched hydrocarbon group such as an isopropyl group, an isobutyl group, a t-butyl group, a thexyl group, etc.; a saturated cyclic hydrocarbon group such as a cyclobutyl group, a cyclopentyl group, a cyclohexyl group, etc.; an unsaturated cyclic hydrocarbon group such as a phenyl group, a pentamethylphenyl group, etc. $R^{12}$ and $R^{13}$ may be the same or different. Of those mentioned above, preferred is a linear hydrocarbon group having from 1 to 6 carbon atoms; and more preferred are a methyl group and an ethyl group.

$R^{14}$ and $R^{15}$ may be a linear or branched alkyl group, including a methyl group, an ethyl group, an n-propyl group, an isopropyl group, an n-butyl group, an isobutyl group, a sec-butyl group, a t-butyl group, an n-pentyl group, an n-hexyl group, an n-octyl group, etc. $R^{14}$ and $R^{15}$ may be the same or different. For these, preferred is a linear hydrocarbon group having from 1 to 6 carbon atoms; and more preferred is a methyl group.

Preferred examples of the silicon compounds of formula (V) are neopentyl-n-propyldimethoxysilane, neopentyl-n-butyldimethoxysilane, neopentyl-n-pentyldimethoxysilane, neopentyl-n-hexyldimethoxysilane, neopentyl-n-heptyldimethoxysilane, isobutyl-n-propyldimethoxysilane, isobutyl-n-butyldimethoxysilane, isobutyl-n-pentyldimethoxysilane, isobutyl-n-hexyldimethoxysilane, isobutyl-n-heptyldimethoxysilane, 2-cyclohexylpropyl-n-propyldimethoxysilane, 2-cyclohexylbutyl-n-propyldimethoxysilane, 2-cyclohexylpentyl-n-propyldimethoxysilane, 2-cyclohexylhexyl-n-propyldimethoxysilane, 2-cyclohexylheptyl-n-propyldimethoxysilane, 2-cyclopentylpropyl-n-propyldimethoxysilane, 2-cyclopentylbutyl-n-propyldimethoxysilane, 2-cyclopentylpentyl-n-propyldimethoxysilane, 2-cyclopentylhexyl-n-propyldimethoxysilane, 2-cyclopentylheptyl-n- propyldimethoxysilane, isopentyl-n-propyldimethoxysilane, isopentyl-n-butyldimethoxysilane, isopentyl-n-pentyldimethoxysilane, isopentyl-n-hexyldimethoxysilane, isopentyl-n-heptyldimethoxysilane, isopentylisobutyldimethoxysilane, isopentylneopentyldimethoxysilane, diisopentyldimethoxysilane, diisoheptyldimethoxysilane, diisohexyldimethoxysilane, etc. More preferred are neopentyl-n-propyldimethoxysilane, neopentyl-n-pentyldimethoxysilane, isopentylneopentyldimethoxysilane, diisopentyldimethoxysilane, diisoheptyldimethoxysilane, and diisohexyldimethoxysilane; and even more preferred are neopentyl-n-pentyldimethoxysilane, and diisopentyldimethoxysilane.

The silicon compounds of formula (V) may be produced in any known manner. Typical routes for producing them are mentioned below.

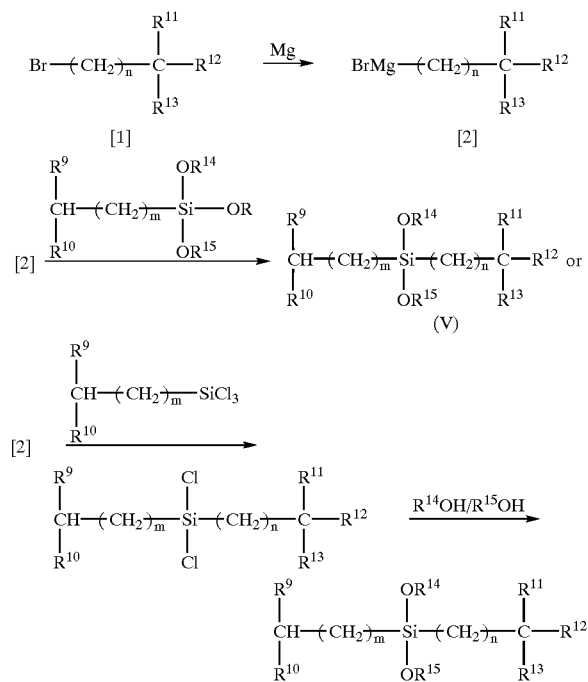

In these routes, the starting compound [1] is available on the market, or can be prepared in any known alkylation, halogenation, etc. The compound [1] is processed for known Grignard reaction to give the organosilicon compounds of formula (V).

One or more such organosilicon compounds may be used herein either singly or as combined.

Specific examples of nitrogen-containing compounds usable herein are 2,6-substituted piperidines such as 2,6-diisopropylpiperidine, 2,6-diisopropyl-4-methylpiperidiner N-methyl-2,2,6,6-tetramethylpiperidine, etc.; 2,5-substituted azolidines such as 2,5-diisopropylazolidine, N-methyl-2,2,5,5-tetramethylazolidine, etc.; substituted methylenediamines such as N,N,N',N'-tetramethylmethylenediamine, N,N,N',N'-tetraethylmethylenediamine, etc.; substituted imidazolidines such as 1,3-dibenzylimidazolidine, 1,3-dibenzyl-2-phenylimidazolidine, etc.

Specific examples of phosphorus-containing compounds also usable herein are phosphites such as triethyl phosphite, tri-n-propyl phosphite, triisopropyl phosphite, tri-n-butyl phosphite, triisobutyl phosphite, diethyl-n-butyl phosphite, diethylphenyl phosphite, etc.

Specific examples of oxygen-containing compounds also usable herein are 2,6-substituted tetrahydrofurans such as 2,2,6,6-tetramethyltetrahydrofuran, 2,2,6,6-tetraethyltetrahydrofuran, etc.; dimethoxymethane derivatives such as 1,1-dimethoxy-2,3,4,5-tetrachlorocyclopentadiene, 9,9-dimethoxyfluorenone, diphenyldimethoxymethane, etc.

Method for Preparing Solid Catalyst Component

To prepare the solid catalyst component (A), the magnesium compound (a), the titanium compound (b), the electron donor (c) and optionally the silicon compound (d) may be contacted with each other in any ordinary manner except for the reaction temperature, and the order of contacting them is not specifically defined. For example, the components may be contacted with each other in the presence of an inert solvent of, for example, hydrocarbons; or they may be previously diluted with an inert solvent of, for example, hydrocarbons, and thereafter contacted with each other. The inert solvent includes, for example, aliphatic hydrocarbons and alicyclic hydrocarbons such as octane, decane, ethylcyclohexane, etc., and their mixtures.

For the reaction, the amount of the titanium compound to be used falls generally between 0.5 and 100 mols, but preferably between 1 and 50 mols, relative to one mol of magnesium in the magnesium compound to be reacted therewith. If the molar ratio oversteps the defined range, the activity of the catalyst to be prepared will be poor. The amount of the electron donor for the reaction falls generally between 0.01 and 10 mols, but preferably between 0.05 and 1.0 mol, relative to one mol of magnesium in the magnesium compound to be reacted therewith. If the molar ratio oversteps the defined range, the activity and the stereospecificity of the catalyst to be prepared will be poor. The amount of the silicon compound, if used, may fall generally between 0.001 and 100 mols, but preferably between 0.005 and 5.0 mols, relative to one mol of magnesium in the magnesium compound to be reacted therewith. If the molar ratio oversteps the defined range, the activity and the stereospecificity of the catalyst to be prepared could not be well improved, and, in addition, the amount of fine powder in the polymers to be produced in the presence of the catalyst will increase.

To prepare the solid catalyst component, the compounds (a) to (d) are contacted with each other all at a time, at a temperature falling between 120 and 150° C., preferably between 125 and 140° C. If the temperature at which the compounds are contacted with each other oversteps the defined range, the activity and the stereospecificity of the catalyst to be prepared could not be improved satisfactorily. The time for which the compounds are contacted with each other generally falls between 1 minute and 24 hours, preferably between 10 minutes and 6 hours. The pressure for the contacting reaction varies, depending on the type of the solvent, if used, and on the temperature at which the compounds are contacted with each other, but may fall generally between 0 and 50 kg/cm$^2$G, preferably between 0 and 10 kg/cm$^2$G. During the contacting operation, it is desirable to agitate the compounds being contacted with each other, for ensuring uniform contact and high contact efficiency.

It is also desirable to contact the titanium compound with the other compounds repeatedly twice or more, whereby the titanium compound could be fully held on the magnesium compound serving as a catalyst carrier.

The amount of the solvent, if used, for the contacting operation may be generally up to 5000 ml, preferably falling between 10 and 1000 ml, relative to one mol of the titanium compound. If the ratio of the solvent used oversteps the defined range, uniform contact could not be effected or, as the case may be, the contact efficiency will be low.

It is desirable that the solid catalyst component having been prepared through the contacting operation as above is washed with an inert solvent at a temperature falling generally between 100 and 150° C., preferably between 120 and 140° C. If the washing temperature oversteps the defined range, the activity and the stereospecificity of the catalyst to be prepared could not be fully improved. The inert solvent includes, for example, aliphatic hydrocarbons such as octane, decane, etc.; alicyclic hydrocarbons such as methylcyclohexane, ethylcyclohexane, etc.; aromatic hydrocarbons such as toluene, xylene, etc.; halogenohydrocarbons such as tetrachloroethane, chlorofluorohydrocarbons, etc.; and their mixtures. Of those, preferred are aliphatic hydrocarbons.

The washing method is not specifically defined, for which preferred is decantation, filtration or the like. The amount of the inert solvent to be used, the washing time, and the number of washing repetitions are not also specifically defined. For example, in one washing operation, from 100 to 100000 ml, preferably from 1000 to 50000 ml of the solvent is used relative to one mol of the magnesium compound used. In general, one washing operation takes 1 minute to 24 hours, preferably 10 minutes to 6 hours. If the amount of the washing solvent to be used and the washing time overstep the defined ranges, the solid catalyst component prepared will be washed insufficiently.

The pressure for the washing operation varies, depending on the type of the solvent used and on the washing temperature, but may fall generally between 0 and 50 kg/cm$^2$G, preferably between 0 and 10 kg/cm$^2$G. During the washing operation, it is desirable to agitate the system so as to ensure uniform washing and high washing efficiency.

The solid catalyst component prepared may be stored in dry, or in an inert solvent of, for example, hydrocarbons, etc.

Method of Copolymerization

For copolymerizing ethylene and propylene in the invention, employable is any method of vapor-phase polymerization, solution polymerization, slurry polymerization, bulk polymerization or the like. However, for producing the copolymers [A] and [B], preferred is vapor-phase polymerization in which the comonomers used can be well led into the polypropylene-based copolymer produced, not dissolving out of the polymerization system. Therefore, such vapor-phase polymerization ensures a high yield of the copolymer product relative to the olefins consumed for it, and is favorable to industrial-scale lines. In producing the copolymers, the amount of the catalyst to be used is not specifically defined. For example, the solid catalyst component (A) may be used generally in an amount of from 0.00005 to 1 mmol in terms of the titanium atom therein, per one liter of the reaction capacity; and the amount of the organoaluminium compound (B) maybe so controlled that the atomic ratio of aluminium/titanium falls generally between 1 and 1000, preferably between 10 and 500. If the atomic ratio oversteps the defined range, the catalyst activity will be low. The amount of the electron donor compound of, for example, organosilicon compounds and others, if used, for the third component (C) may be so controlled that the molar ratio of electron donor compound (C)/ organoaluminium compound (B) falls generally between 0.001 and 5.0, preferably between 0.01 and 2.0, more preferably between 0.05 and 1.0. If the molar ratio oversteps the defined range, the activity and the stereospecificity of the catalyst will be poor. However, in case where the monomers are pre-polymerized in the presence of the catalyst, the molar ratio could be smaller than the defined range.

In the invention, if desired, olefins may be prepolymerized prior to the final polymerization of the monomers. This is for ensuring the polymerization activity of the catalyst used, and ensuring the stereospecificity of the copolymers produced, and for reducing the amount of fine powdery polymer products that may be formed during the copolymerization. For example, olefins are pre-polymerized in the presence of the catalyst having been prepared by blending the solid catalyst component (A), the organoaluminium compound (B) and optionally the electron donor compound (C) in a pre-determined ratio, at a temperature generally falling between 1 and 100° C. and under a pressure generally falling between ordinary pressure and 50 kg/cm$^2$G or so, and thereafter propylene and its comonomer ethylene are finally polymerized in the presence of the catalyst and the pre-polymerized product. Olefins to be used for such prepolymerization are preferably α-olefins of a general formula (VI):

$$R^{16}\text{—CH}\!=\!\text{CH}_2 \hspace{2cm} \text{(VI)}.$$

In formula (VI), $R^{16}$ represents a hydrogen atom or a hydrocarbon group which may be saturated or unsaturated. Concretely, the α-olefins include ethylene, propylene, 1-butene, 1-pentene, 1-hexene, 1-heptene, 1-octene, 1-decene, 3-methyl-1-pentene, 4-methyl-1-pentene, vinylcyclohexane, butadiene, isoprene, piperylene, etc. One or more of these olefins maybe used either singly or as combined. Of the olefins mentioned above, preferred are ethylene and propylene.

In the invention, the polymerization condition varies, depending on the polymerization method. For vapor-phase polymerization in the presence of the catalyst mentioned herein, for example, the polymerization temperature preferably falls between 50 and 100° C., more preferably between 60 and 90° C. If the polymerization temperature is lower than 50° C., the transparency of the propylene-based copolymer to be produced will be low. The polymerization pressure generally falls between 1 and 100 kg/cm$^2$G, but preferably between 1 and 50 kg/cm$^2$G, under which a mixed gas of propylene and ethylene is introduced into the catalyst system to copolymerize the monomers. The polymerization time could not be defined indiscriminately, as varying depending on the polymerization temperature for the starting monomers, propylene and ethylene. In general, however, it may fall between 5 minutes and 20 hours, but preferably between 10 minutes and 10 hours or so. The blend ratio of propylene to ethylene could not be also defined indiscriminately, as varying depending on the polymerization temperature and pressure. Preferably, the blend ratio is so controlled that the copolymer [A] and the copolymer [B] produced differ in the ethylene content thereof. In preparing the copolymer [A], the ratio by volume of propylene/ ethylene (vol/vol) may generally fall between 50/1 and 5/1, but preferably between 30/1 and 7/1. In preparing the copolymer [B], the ratio by volume of propylene/ethylene (vol/vol) may fall generally between 8/1 and 3/2, but preferably between 4/1 and 2/1.

The molecular weight of the copolymers may be controlled by adding a chain transfer agent, preferably hydrogen, to the polymerization system. If desired, the copolymerization may be effected in an inert gas such as nitrogen, etc.

In the invention, the catalyst components (A), (B) and (C) are mixed in a predetermined ratio and contacted with each other in a reactor, and propylene and ethylene may be immediately introduced thereinto to polymerize them; or after the components have been contacted with each other in that manner and ripened for 0.2 to 3 hours or so, and then propylene and ethylene may be introduced thereinto to polymerize them. If desired, the catalyst components may be fed into the reactor after having been suspended in an inert solvent or propylene.

[4] Method for Producing Propylene-based Copolymer:

The method for producing the propylene-based copolymer of the invention is described below.

For producing the propylene-based copolymer, the above-mentioned propylene-ethylene copolymers [A] and [B] are blended. For blending them, usable is a mode of powder blending in a Banbury mixer, a double-screw extruder or the like; or a mode of reactor blending in the polymerization reactor in which the copolymers are prepared. Preferred is reactor blending, as ensuring high production efficiency and ensuring good flexibility of the propylene-based copolymer produced.

Propylene block copolymerization of copolymerizing propylene and ethylene in multiple stages may apply to the mode of reactor blending. Concretely, the propylene-ethylene copolymers [A] and [B] are prepared from propylene andethylene in multi-stage polymerization. For example, the ethylene-propylene copolymer [A] is prepared in the first stage, and the ethylene-propylene copolymer [B] is then prepared in the second stage. [A] and [B] may be prepared in any of the first and second stages. However, it is preferable that [A] is prepared in the first stage and then [B] in the second stage. To such multi-stage polymerization, any mode of batch polymerization or continuous polymerization may apply.

For the polymerization conditions in the first and second stages in multi-polymerization, referred to are those mentioned hereinabove. If desired, a molecular weight-controlling agent such as hydrogen or the like ma be added to the system. The ratio of the copolymer [A] to [B] may be varied, depending on the polymerization time and the polymerization pressure.

After having been produced, the propylene-based copolymer of the invention may be post-treated in any ordinary manner. For example, in vapor-phase polymerization, the powdery copolymer produced is taken out of the reactor, and may be passed through nitrogen streams so as to remove the olefins from it, and, if desired, it may be pelletized through an extruder. In this stage, a small amount of water, alcohol or the like may be added thereto so as to completely deactivate the catalyst used. In bulk polymerization, the copolymer produced is taken out of the reactor, then the monomers are completely removed from it, and thereafter the copolymer may be pelletized.

The propylene-based copolymer of the invention may be mixed with any other polypropylene resin. The polypropylene resin that may be added to the copolymer include polypropylene homopolymers; polypropylene-α-olefin random copolymers in which the α-olefin is at least one except propylene, including, for example, ethylene, 1-butene, 1-pentene, 1-hexene, etc., and of which the α-olefin content is at most 15% by weight; propylene block copolymers, random block copolymers, etc. When these are blended, any known antioxidant, neutralizing agent, antistatic agent, weather-resisting agent, anti-blocking agent and the like ordinarily used in conventional polyolefins may be added thereto, if desired.

[II] Moldings:

The moldings of the invention are formed by molding the above-mentioned propylene-based copolymer in various molding methods of injection molding, extrusion molding, thermoforming, etc. The moldings are especially favorable to films, sheets and fibers, as being flexible and transparent. The moldings may be drawn or stretched for secondary working. For example, the drawn or stretched moldings include monoaxially-stretched films, biaxially-stretched films, fibers, etc. The films of the invention are formed by sheeting the above-mentioned propylene-based copolymer, and have the advantage of high transparency. The films generally have a haze of at most 15%, preferably at most 10%. The method of forming the films is not specifically defined, to which is applicable ordinary T-die casting. Concretely, various additives are optionally added to the powdery propylene-based copolymer, and the resulting mixture is extruded and granulated through a kneader, then pelletized, and cast into films through a T-die. In an ordinary T-die casting method, the propylene-based copolymer of the invention can be formed into films having a thickness of from 10 to 500 μm even in high-speed film-forming condition at a take-up speed of 50 m/min or more. As having the good characteristics mentioned above, the propylene-based copolymer is favorable to co-extrusion sheeting to give laminate films in which the copolymer forms at least one layer. The copolymer may be co-extruded along with any other resin into multi-layered laminate films or moldings. For sheeting the copolymer into films, preferred is high-speed T-die casting in large-scale sheeting machines, which, however, is not limitative. Any other methods capable of forming films from the copolymer through melt extrusion molding are employable for sheeting the copolymer.

Some examples of additive formulation are mentioned below.

Additive Formulation (A):

<1> Antioxidant

Ciba Speciality Chemicals' Irganox 1010: 1000 ppm

Ciba Speciality Chemicals' Irgafos 168: 1000 ppm

<2> Neutralizing agent

Calcium stearate: 1000 ppm

<3> Anti-blocking agent

Fuji Silicia's silica-type anti-blocking agent:

<4> Slip agent: 1000 ppm

Erucic amide: 250 ppm

Additive Formulation (B):

<1> Antioxidant

Ciba Speciality Chemicals' Irganox 1010: 1000 ppm

Ciba Speciality Chemicals' Irgafos 168: 1000 ppm

<2> Neutralizing agent

Calcium stearate: 1000 ppm

<3> Anti-blocking agent

Fuji Silicia's silica-type anti-blocking agent: 2300 ppm

<4> Slip agent:

Erucic amide: 500 ppm

The invention is described more concretely with reference to the following Examples, which, however, are not intended to restrict the scope of the invention.

First described are the methods for evaluating the copolymer of the invention. The methods employed in the following Examples and Comparative Examples are the "resin evaluation method" and the "film evaluation method" mentioned below.

Resin Evaluation Method

<1> Determination of α and P in $^{13}$C-NMR:

The sample of a copolymer to be analyzed is subjected to $^{13}$C-NMR under the condition mentioned below to obtain its $^{13}$C-NMR spectral chart, using a JEOL's NMR device, JNM-EX400 Model.

<Condition for NMR>

Sample concentration: 220 mg/3 ml of NMR solvent.

NMR solvent (ratio by volume):
1,2,4-trichlorobenzene/benzene-$d_6$=90/10.

Temperature: 130° C.

Pulse width: 45°.

Pulse frequency: 4 sec.

Number of cycles integrated: 4000.

The assignment of each spectral signal of the propylene-based copolymer appearing in the chart is shown in Table 1. In this, P indicates a propylene unit and E indicates an ethylene unit. Accordingly, PPP means three propylene units connected in series; and EEE means three ethylene units connected in series.

TABLE 1

Assignment in NMR Spectrum (ppm)

| No. | Chemical Shift | Assignment | |
|---|---|---|---|
| (1) | 45.1–47.3 | PPP | Sαα |
| (2) | 37.7–38.3 | | Sαγ |
| (3) | 37.4–37.7 | | Sαδ |
| (4) | 33.2–33.4 | EPE | Tδδ |
| (5) | 30.9–31.3 | PPE | Tβδ |
| (6) | 30.3–30.5 | PEEE | Sγδ |
| (7) | 29.9–30.1 | EEE | Sδδ |
| (8) | 28.3–29.7 | PPP | Tββ |
| (9) | 27.2–27.6 | PEE | Sβδ |
| (10) | 24.0–25.0 | PEP | Sββ |
| (11) | 21.3–22.7 | | Pββ |
| (12) | 20.6–21.3 | | Pββ |
| (13) | 19.8–20.6 | | Pββ |

Note)
Chemical shift standard: 30.01 ppm for the peak top of Sδδ.

The ethylene unit content (α, % by weight) of the propylene-based copolymer is obtained according to the following formula, from the data of the intensity of each signal appearing in the NMR chart of the copolymer.

$$\alpha = 2X/(300-X)$$

wherein;

X=Et/s×100,

Et=IEEE+2/3(IPEE+IEPE)+1/3(IPPE+IPEP),

S=IEPE+IPPE+IEEE+IPPP+IPEE+IPEP,

IEPE=I(4),

IPPP=I(8),

IPPE=I(5),

IPEE=I(9),

IEEE=I(7)/2+I(6)/4,

IPEP=I(10).

For example, I(1) means the intensity of signal No. 1 in Table 1.

The stereospecificity index (P, mol %) of the copolymer is obtained according to the following formula:

$$P = I(11)/(I(11)+I(12)+I(13)-I(4)-I(5)) \times 100.$$

The index P indicates the isotactic fraction of the triad units in the propylene chain region of the copolymer molecular chain. In this formula, the signal intensity of Tβδ (5th signal) is substituted for the signal intensity of the methyl carbon of the center propylene unit in the PPE chain appearing in the mr region; and the signal intensity of Tδδ (4th signal) is substituted for the signal intensity of the methyl carbon of the propylene unit in the EPE chain appearing in the rr region.

<2> Temperature-programmed Fractionation Chromatography (TREF):

A sample solution is introduced into a TREF column controlled at 135° C., then gradually cooled therein to 0°C. at a cooling rate of 5° C./hr, whereby the sample is adsorbed by the filler in the column. Next, the column is heated up to 135° C. at a heating rate of 40° C./hr, and the elution pattern curve of the sample is obtained. The peak temperature for the essential elution peak in the elution pattern curve is represented by Tp. Wp and W0 are obtained from the elution pattern curve.

The apparatus and the condition for TREF are mentioned below.

1) Apparatus:

TREF column: GL Science's silica gel column (4.6φ×150 mm).

Flow cell: from GL Science (optical guide length 1 mm, with KBr cell).

Feed pump; Senshu Science's pump, SSC-3100.

Valve oven: GL science's oven, Model 554.

TREF oven: from GL science.

Two-line temperature controller: Rigaku Kogyo's temperature controller, REX-C100.

Detector: Foxboro's IR detector for liquid chromatography, MIRAN 1A CVF.

10-way valve: Balco's electromotive valve.

Loop: Balco's 500 μl loop.

2) Condition:

Solvent: orthodichlorobenzene.

Sample concentration: 7.5 g/liter.

Sample amount: 500 μl.

Pump flow rate: 2.0 ml/min.

Wavelength for detection: 3.41 μm.

Column filler: Chromosorb P (30 to 60 mesh).

Column temperature distribution: within ±0.2° C.

<3> Limiting Viscosity [η]:

This is measured in a solvent of tetralin at 135° C. $[\eta]_B$ of the copolymer [B] is obtained according to the following equation:

$$[\eta]_B = ([\eta]_H - [\eta]_A \times W_A)/(1-W_A).$$

The limiting viscosity $[\eta]_A$ of the polymer [A] is obtained by analyzing a sample of the polymer according to the method as above. The weight fraction $W_A$ of the polymer [A] is obtained from the yield of the polymer. The weight fraction $(1-W_A)$ of the polymer [B] is obtained from the yield of the polymer [A]. The limiting viscosity $[\eta]_H$ of the propylene block copolymer is obtained by analyzing the final product of the copolymer according to the method as above.

Film Evaluation Method

The films formed herein are all annealed at 40° C. for 24 hours, and then conditioned at a temperature of 23±2° C. at a humidity of 50±10% for at least 16 hours. The characteristics of the thus-conditioned films are measured at the same temperature and the same humidity.

<1> Transparency (Haze):
Measured according to JIS K7105.

<2> Impact Resistance:
Using a Toyo Seiki Seisakusho's film impact tester equipped with a ½-inch impact head, each film was tested to measure its shock fracture strength. O indicates excellent; Δ indicates good; and x indicates bad.

<3> Tensile Modulus:
Each film is subjected to a tensile test according to JIS K-7127 under the condition mentioned below, and its tensile modulus is measured.

Cross head speed: 500 mm/min.

Load cell: 10 kg.

Direction: Machine direction (MD)

<4> Stickiness:
Each film is sensually tested by panelists. O indicates excellent; Δ indicates good; and x indicates bad.

EXAMPLES 1 to 5

Preparation of Solid Catalyst Component 160 g of diethoxymagnesium was put into a 5-liter three-neck flask with a stirrer that had been purged with nitrogen, to which was added 600 ml of dewatered octane. This was heated at 40° C., and 24 ml of silicon tetrachloride was added thereto, and stirred for 20 minutes. 16 ml of dibutyl phthalate was added thereto. The resulting solution was heated up to 80° C., and 770 ml of titanium tetrachloride was dropwise added thereto through a dropping funnel, and contacted with it at 125° C. for 2 hours. Next, this was well washed with dewatered octane at 125° C. 1220 ml of titanium tetrachloride was added thereto and contacted with it at 125° C. for 2 hours. Then, this was well washed with dewatered octane at 125° C. Thus was obtained a solid component [A].

Pre-polymerization

A one-liter three-neck flask with a stirrer was purged with nitrogen, and 48 g of the solid component [A] was put thereinto. 400 ml of dewatered heptane was added to it, and heated at 40° C. 2.0 ml of triethylaluminium and 5.9 ml of isobutyl-n-propyldimethoxysilane were added thereto. Propylene was introduced into this under normal pressure, and reacted for 2 hours. Next, this was well washed with dewatered octane. Thus was obtained a catalyst component.

Production of Propylene Block Copolymer 30 g of polypropylene-ethylene random copolymer powder was put into a 5-liter stainless autoclave equipped with a stirrer, and well purged with nitrogen gas. Next, 2.0 mmols of triethylaluminium, 0.5 mmols of dicyclopentyldimethoxysilane, and 0.01 mmols, in terms of the titanium atom, of the solid catalyst component prepared previously were put thereinto. With that, hydrogen (1.0 kg/cm$^2$G), and ethylene and propylene in a ratio by volume indicated in Table 2 were fed into the autoclave to have a total pressure of 15.0 kg/cm$^2$G, and the monomers were polymerized at 70° C. for 60 minutes to produce a propylene copolymer [A]. Then, the reaction gas in the system was purged away, and the copolymer was sampled to measure its [η]. Subsequently, hydrogen (1.0 kg/cm$^2$G), and ethylene and propylene in a ratio by volume indicated in Table 2 were fed into the autoclave to have a total pressure of 15.0 kg/cm$^2$G, and the monomers were polymerized at 70° C. to produce a propylene copolymer [B]. In this stage, the polymerization time was so controlled that the copolymerization ratio could be as in Table 2. The copolymer was analyzed according to the resin evaluation method mentioned above.

The polypropylene copolymer thus obtained was pelletized through a 20 mmφ extruder, and then formed into a CPP film through a 20 mmφ die. This was evaluated according to the film evaluation method mentioned above. The data obtained are given in Table 2 and Table 3.

COMPARATIVE EXAMPLES 1 to 3

Preparation of Solid Catalyst Component 160 g of diethoxymagnesium was put into a 5-liter three-neck flask with a stirrer that had been purged with nitrogen, to which was added 60 ml of dewatered heptane. This was heated at 40° C., and 24 ml of silicon tetrachloride was added thereto, and stirred for 20 minutes. 25 ml of diethyl phthalate was added thereto. The resulting solution was heated up to 80° C., and 470 ml of titanium tetrachloride was dropwise added thereto through a dropping funnel, and contacted with it at 1100C for 2 hours. Next, this was well washed with dewatered heptane at 90° C. 770 ml of titanium tetrachloride was added thereto and contacted with it at 110° C. for 2 hours. Then, this was well washed with dewatered heptane at 90° C. Thus was obtained a solid component [B].

Pre-polymerization

A one-liter three-neck flask with a stirrer was purged with nitrogen, and 48 g of the solid component [B] was put thereinto. 400 ml of dewatered heptane was added to it, and heated at 10° C. 2.7 ml of triethylaluminium and 2.0 ml of cyclohexylmethyldimethoxysilane were added thereto. Propylene was introduced into this under normal pressure, and reacted for 2 hours. Next, this was well washed with dewatered heptane. Thus was obtained a catalyst component.

Production of Propylene Block Copolymer 30 g of polypropylene-ethylene random copolymer powder was put into a 5-liter stainless autoclave equipped with a stirrer, and well purged with nitrogen gas. Next, 2.0 mmols of triethylaluminium, 0.5 mmols of dicyclopentyldimethoxysilane, and 0.01 mmols, in terms of the titanium atom, of the solid catalyst component prepared previously were put thereinto. With that, ethylene and propylene in a ratio by volume indicated in Table 4 were fed into the autoclave to have a total pressure of 15.0 kg/Gm$^2$G, and polymerized at 70° C. for 60 minutes to produce a propylene copolymer [A]. Then, the reaction gas in the system was purged away, and the copolymer was sampled to measure its [η]. Subsequently, hydrogen (1.0 kg/cm$^2$G), and ethylene and propylene in a ratio by volume indicated in Table 4 were fed into the autoclave to have a total pressure of 15.0 kg/cm$^2$G, and the monomers were polymerized at 70° C. to produce a propylene copolymer [B]. In this stage, the polymerization time was so controlled that the copolymerization ratio could be as in Table 4. The copolymer was analyzed according to the resine valuation method mentioned above.

The polypropylene copolymer thus obtained was pelletized through a 20 mmφ extruder, and then formed into a CPP film through a 20 mmφ die. This was evaluated according to the film evaluation method mentioned above. The data obtained are given in Table 4 and Table 5.

COMPARATIVE EXAMPLES 4, 5

Production of Propylene Block Copolymer 30 g of polypropylene powder was put into a 5-liter stainless autoclave equipped with a stirrer, and well purged with nitrogen gas. Next, 2.0 mmols of triethylaluminium, 0.5 mmols of dicyclopentyldimethoxysilane, and 0.01 mmols, in terms of the titanium atom, of the same solid catalyst component as in Comparative Examples 1 and 2 were put thereinto. With that, hydrogen (5.0 kg/cm$^2$G) and propylene (23.0 kg/cm$^2$G) were fed into the autoclave to have a total pressure of 28.0 kg/cm$^2$G, and polymerized at 70° C. for 45 minutes to produce a propylene homopolymer. Then, the reaction gas in the system was purged away, and the polymer was sampled to measure its [η]. Subsequently, hydrogen (3.0 kg/cm$^2$G), and ethylene and propylene in a ratio by volume indicated in Table 4 were fed into the autoclave to have a total pressure of 15.0 kg/cm$^2$G, and the monomers were polymerized at 70° C. to produce a propylene block copolymer [B]. In this stage, the polymerization time was so controlled that the copolymerization ratio could be as in Table 4. The copolymer was analyzed according to the resin evaluation method mentioned above.

The polypropylene copolymer thus obtained was pelletized through a 20 mmφ extruder, and then formed into a CPP film through a 20 mmφ die. This was evaluated according to the film evaluation method mentioned above. The data obtained are given in Table 4 and Table 5.

COMPARATIVE EXAMPLE 6

Production of Propylene Random Copolymer 30 g of polypropylene-ethylene random copolymer powder was put into a 5-liter stainless autoclave equipped with a stirrer, and well purged with nitrogen gas. Next, 2.0 mmols of triethylaluminium, 0.5 mmols of dicyclopentyldimethoxysilane, and 0.01 mmols, in terms of the titanium atom, of the same solid catalyst component as in Example were put thereinto. With that, hydrogen (1.0 kg/cm$^2$G) and ethylene and propylene in a ratio by volume indicated in Table 4 were fed into the autoclave to have a total pressure of 15.0 kg/cm$^2$G, and the monomers were polymerized at 70° C. for 60 minutes to produce a propylene copolymer [A]. This was analyzed according to the resin evaluation method mentioned above.

The polypropylene copolymer thus obtained was pelletized through a 20 mmφ extruder, and then formed into a CPP film through a 20 mmφ die. This was evaluated according to the film evaluation method mentioned above. The data obtained are given in Table 4 and Table 5.

TABLE 2

|  | Example 1 | Example 2 | Example 3 | Example 4 | Example 5 |
| --- | --- | --- | --- | --- | --- |
| Propylene Copolymer A |  |  |  |  |  |
| Amount of Hydrogen (kg/cm$^2$G) | 1 | 1 | 1 | 1 | 1 |
| Type of Comonomer | ethylene | ethylene | ethylene | ethylene | ethylene |
| Monomer Gas Composition (vol. %) (propylene/ethylene) | 12/1 | 12/1 | 12/1 | 12/1 | 12/1 |
| [η] (dl/g) | 2.07 | 1.96 | 2.02 | 1.88 | 2.16 |
| Ethylene Content (wt. %) (α) | 3.9 | 4 | 5.4 | 3.8 | 4.3 |
| Wp (wt. %) | 53.9 | 53.1 | 35.3 | 54.3 | 49.8 |
| W0 (wt. %) | 2.11 | 2.18 | 2.52 | 2.05 | 2.35 |
| (3 + 2α)/4 | 2.7 | 2.75 | 3.45 | 2.65 | 2.9 |
| Propylene Copolymer B |  |  |  |  |  |
| Proportion of Polymer (wt. %) | 26.6 | 32.3 | 29.3 | 42.6 | 45.8 |
| Amount of Hydrogen (kg/cm$^2$G) | 1 | 1 | 1 | 1 | 1 |
| Type of Comonomer | ethylene | ethylene | ethylene | ethylene | ethylene |
| Monomer Gas Composition (vol. %) (propylene/ethylene) | 4/1 | 2/1 | 4/1 | 4/1 | 4/1 |
| [η] (dl/g) | 2.41 | 2.09 | 2.36 | 2.22 | 2.32 |
| Ethylene Content (wt. %) | 16 | 23.5 | 15.6 | 15.5 | 15.7 |

TABLE 3

|  | Example 1 | Example 2 | Example 3 | Example 4 | Example 5 |
| --- | --- | --- | --- | --- | --- |
| Physical Properties of Film |  |  |  |  |  |
| Haze (%) | 2.3 | 6 | 2.2 | 1.6 | 1.4 |
| Tensile Modulus (MPa) | 419 | 383 | 316 | 254 | 218 |
| Impact Resistance | ○ | ○ | ○ | ○ | ○ |
| Stickiness | ○ | ○ | ○ | ○ | ○ |

TABLE 4

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Propylene Copolymer A |  |  |  |  |  |  |
| Amount of Hydrogen (kg/cm$^2$G) | 1 | 1 | 1 | 5 | 5 | 1 |
| Type of Comonomer | ethylene | ethylene | ethylene | — | — | ethylene |
| Monomer Gas Composition (vol. %) (propylene/ethylene) | 10/1 | 7/1 | 12/1 | — | — | 12/1 |
| [η] (dl/g) | 1.24 | 1.61 | 1.89 | 1.3 | 1.3 | 1.92 |
| Ethylene Content (wt. %) (α) | 6.5 | 9.4 | 4.3 | — | — | 4.0 |
| Wp (wt. %) | 25.3 | 12.5 | 49.8 | — | — | 53.1 |
| W0 (wt. %) | 4.2 | 5.7 | 2.35 | — | — | 2.18 |
| (3 + 2α)/4 | 4 | 5.45 | 2.9 | — | — | 2.75 |
| Propylene Copolymer B |  |  |  |  |  |  |
| Proportion of Polymer (wt. %) | 50 | 44.4 | 63.4 | 62 | 21 | — |
| Amount of Hydrogen (kg/cm$^2$G) | 1 | 1 | 1 | 3 | 3 | — |
| Type of Comonomer | ethylene | ethylene | ethylene | ethylene | ethylene | — |
| Monomer Gas Composition (vol. %) (propylene/ethylene) | 4/1 | 1/1 | 2/1 | 7/3 | 7/3 | — |
| [η] (dl/g) | 2.24 | 3.15 | 2.74 | 1.7 | 1.7 | — |
| Ethylene Content (wt. %) | 21.9 | 40.4 | 21.2 | 24 | 25 | — |

TABLE 5

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Physical Properties of Film |  |  |  |  |  |  |
| Haze (%) | 5.7 | 86.2 | film not formed | 1.6 | 20.3 | 4.3 |
| Tensile Modulus (MPa) | 223 | 268 | — | 143 | 1110 | 850 |
| Impact Resistance | Δ | ○ | — | ○ | Δ | Δ |
| Stickiness | x | x | — | x | ○ | ○ |

INDUSTRIAL APPLICABILITY

The propylene block copolymer of the invention is transparent and has good ordinary impact resistance, good cold impact resistance, and well-balanced flexibility and blocking resistance. This is favorably formed into films, sheets, fibers, etc.

What is claimed is:

1. A propylene-based copolymer comprising from 50 to 90% by weight of a propylene-ethylene copolymer [A] that satisfies the following (1) to (3), and from 10 to 50% by weight of a propylene-ethylene copolymer [B] having an ethylene content of from 10 to 25% by weight:

(1) Its ethylene content (α) measured in $^{13}$C-NMR falls between 0.2 and 10% by weight;

(2) The amount of its fraction (Wp) eluted within the temperature range between (Tp−5)° C. and (Tp+5)° C. is at least 20% by weight, with Tp (°C.) being the peak temperature for essential elution in temperature-programmed fractionation chromatography of the copolymer; and (3) The amount of its fraction (W0) eluted within the temperature range not higher than 0° C. in temperature-programmed fractionation chromatography of the copolymer, and α satisfy a relation of W0≦(3+2α)/4.

2. The propylene-based copolymer of claim 1, which is obtained in propylene block copolymerization for copolymerizing propylene and ethylene in multiple stages.

3. The propylene-based copolymer of claim 2, for which the propylene block copolymerization is for multi-stage polymerization of propylene and ethylene in the presence of a catalyst that comprises (A) a solid catalyst component obtained by reacting a magnesium compound, a titanium compound and an electron donor compound through their contact with each other, (B) an organoaluminium compound, and (C) an organosilicon compound of the following general formula (I):

$$SiR^1{}_2(OR^2)_2 \qquad (I)$$

wherein $R^1$ represents a branched chain hydrocarbon group having from 1 to 20 carbon atoms, or a saturated cyclic hydrocarbon group; $R^2$ represents a linear or branched chain hydrocarbon group having from 1 to 4 carbon atoms; and these may be the same or different.

4. The propylene-based copolymer of claim 2, for which the propylene block copolymerization in is for multi-stage polymerization of propylene and ethylene in the presence of a catalyst that comprises (A) a solid catalyst component obtained by contacting a magnesium compound, a titanium compound, an electron donor compound and optionally a silicon compound with each other at a temperature falling between 120° C. and 150° C., followed by washing the resulting product in an inert solvent at a temperature falling between 100° C. and 150° C., (B) an organoaluminium compound, and optionally (C) an electron donor compound serving as a third component.

5. A molding of the propylene-based copolymer of claim 1.

6. The propylene-based copolymer of claim 1, which comprises from 50 to 85% by weight of a propylene-ethylene copolymer A that satisfies the following (1) to (3), and from 15 to 50% by weight of a propylene-ethylene copolymer B having an ethylene content of from 10 to 25% by weight:

(1) Its ethylene content (α) measured in $^{13}$C-NMR falls between 0.5 and 9% by weight;

(2) The amount of its fraction (Wp) eluted within the temperature range between (Tp−5)° C. and (Tp+5)° C. is at least 20% by weight, with Tp (°C.) being the peak temperature for essential elution in temperature-programmed fractionation chromatography of the copolymer; and (3) The amount of its fraction (W0) eluted within the temperature range not higher than 0° C. in temperature programmed fractionation chromatography of the copolymer, and a satisfy a relation of W0≦(3+2α)/4.

7. The propylene-based copolymer of claim 1, which satisfies the following requirement:

$$TM < 2 \times 10^5 \times (\beta)^{-1.7}$$

wherein β indicates the amount of the component B %, by weight, in the copolymer, and TM indicates the tensile modulus (MPa) of the copolymer.

* * * * *